(12) United States Patent
Itokawa et al.

(10) Patent No.: US 7,481,326 B2
(45) Date of Patent: Jan. 27, 2009

(54) SYNTHETIC RESIN BOTTLE WITH A HANDLE

(75) Inventors: Junichi Itokawa, Koto-ku (JP); Yoshinori Matsuo, Koto-ku (JP); Takao Iizuka, Koto-ku (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 472 days.

(21) Appl. No.: 10/511,307

(22) PCT Filed: Jul. 31, 2003

(86) PCT No.: PCT/JP03/09709

§ 371 (c)(1),
(2), (4) Date: Jul. 13, 2005

(87) PCT Pub. No.: WO2004/011228

PCT Pub. Date: Feb. 5, 2004

(65) Prior Publication Data

US 2006/0021960 A1    Feb. 2, 2006

(30) Foreign Application Priority Data

Jul. 31, 2002  (JP)  ............................... 2002-224042
Aug. 30, 2002  (JP)  ............................... 2002-255119

(51) Int. Cl.
*B65D 23/10*  (2006.01)

(52) U.S. Cl. ........................ 215/398; 215/396; 220/771

(58) Field of Classification Search ......... 215/396–398; 220/770, 771

See application file for complete search history.

(56) References Cited

U.S. PATENT DOCUMENTS

| 4,964,522 | A | * | 10/1990 | Umetsu et al. | ............... 215/398 |
| 5,535,901 | A | | 7/1996 | Ishii et al. | |
| 5,819,966 | A | * | 10/1998 | Ota et al. | ..................... 215/398 |
| 5,931,324 | A | * | 8/1999 | Lyons et al. | ................. 215/398 |
| 6,012,597 | A | * | 1/2000 | Nishihara et al. | ........... 215/398 |
| 7,108,146 | B2 | * | 9/2006 | Itokawa et al. | ............... 215/398 |
| 7,185,777 | B2 | * | 3/2007 | Itokawa et al. | ............... 215/398 |

FOREIGN PATENT DOCUMENTS

| EP | 0 650 900 A1 | 5/1995 |
| JP | A-06-156502 | 6/1994 |
| JP | A-06-298253 | 10/1994 |

(Continued)

*Primary Examiner*—Sue A Weaver
(74) *Attorney, Agent, or Firm*—Oliff & Berridge, PLC

(57) ABSTRACT

A biaxially drawn and blow-molded bottle made of synthetic resin with a handle, the handle is injection-molded, made of a synthetic resin and fitted firmly to the bottle, the bottle also has a recession with a projecting wall in a central part of the recession, and the handle has a pair of beams parallel to each other and on opposite sides of the projecting wall and a grip plate integrally connected between the pair of beams, the beams also have embedded ridges disposed centrally along an axis of each beam wherein the embedded ridges extend from the pair of beams to engage the recession and the projecting wall, and the embedded ridges each have a central plane approximately perpendicular to the axis of the beam on which the embedded ridges are disposed and the embedded ridges become wider along the plane as they extend away from the beams.

10 Claims, 12 Drawing Sheets

FOREIGN PATENT DOCUMENTS

| JP | A-07-080921 | | 3/1995 |
|---|---|---|---|
| JP | 07156952 A | * | 6/1995 |
| JP | A-11-034155 | | 2/1999 |
| JP | A-2000-335584 | | 12/2000 |
| JP | A-2001-328636 | | 11/2001 |

* cited by examiner (a) C—C Cross-section (b) D—D Cross-section

50μ

(a) After the Smoothing Treatment

50μ

(b) Before the Smoothing Treatment

SYNTHETIC RESIN BOTTLE WITH A HANDLE

TECHNICAL FIELD

This invention relates to a synthetic resin bottle with a handle, and in particular, a large-size synthetic resin bottle with a handle, in which the handle is fitted firmly to the bottle by using the handle made of a synthetic resin as an insert and by drawing biaxially and blow-molding the bottle of a polyethylene terephthalate resin (hereinafter referred to as the PET resin).

As a large-size bottle, which is easy to handle, there is known a synthetic resin bottle with a handle, in which the handle has been previously injection-molded into a certain shape, and in which the PET bottle is biaxially drawn and blow-molded while using such a handle as an insert. As the handles to be used with this type of synthetic resin bottles with a handle, there are one disclosed in Japanese patent No. 2998820 and another one disclosed in the Japanese Patent Application No. 2001-328636, which is an improvement from the above patent. A lot of these handles are in common use because stable and firm fitting can be secured and because handling of the inserts is easy.

The handle disclosed in the Japanese Patent Application No. 2001-328636 is as shown in FIG. 1 and FIGS. 9-12. The handle comprises a grip plate 11' in a vertical strip shape, embedded projecting pieces 15' disposed on the front end faces at the extended end of this grip plate 11', a pair of engaging ridges 16' in a vertical ridge shape disposed on the sides facing each other, a pair of fitting beams 12' in a vertical rod shape, which is provided with the parts serving for the engagement and fitting with the bottle 1', and a pair of connecting arms 12a' in the curved rod shape, which connect between the pair of fitting beams 12' at both the upper and lower ends of the grip plate 11'.

In the case of this handle 10' shown in these drawings, a vertical projecting wall 5' is held tight by the pair of fitting beams 12' when the vertical projecting wall 5' is formed in the recession 3' of the bottle 1'. Therefore, the handle 10' is stably and firmly fitted to the bottle 1'.

The afore-mentioned bottle with a handle can be obtained when injection-molded PET preform P' is blow-molded into the bottle 1'. At that time, the handle 10' previously injection-molded from, for example, polypropylene or PET is fitted to the bottom of the handle-fitting recession 3' at the rear of the body 2' of the bottle 1' by means of simultaneous insert molding.

During the process of afore-mentioned insert molding, the heated and softened PET, with which the preform P' is made of, is smoothly deformed as the PET wall moves along the shapes of the embedded projecting pieces 15' and the engaging ridges 16', which are the inserts of the handle 10' and are fitted firmly to the bottle 1'. High fitting strength between the handle 10' and the bottle 1' is obtained by allowing the PET bottle wall to get around the peripheries of the handle inserts smoothly and tightly.

Smooth deformation such as described above becomes difficult when fairly high stress, which is called the stress hardening, is generated in the PET at the stage in which the preform P' has been drawn to a considerable degree. Therefore, handle insert portions are disposed at positions as close to the preform as possible so that the insert into the bottle 1' can be achieved in the initial stage of drawing.

However, in the field of alcoholic beverages, juices and other soft drinks, there has lately been an increasing need for larger containers. A further strengthened handle structure is pursued so that the bottles having a capacity as large as a few liters may not be broken under the stringent drop impact tests.

On the other hand, even if the bottles have a larger capacity than before, the neck does not have a correspondingly large diameter, but has the same diameter as that of small-size bottles in many cases because of the easiness to discharge the contents. As a result, the handle inserts tend to be disposed away from the preform, leaving the PET wall to get around the inserts insufficiently toward the outer peripheries of the inserts.

This invention has been made to solve the afore-mentioned problem. The technical problems of this invention are to improve the insert moldability of the handle and to strengthen the fitting of the handle to the PET bottle to a high level by improving the fitting structure. The object of this invention is to provide a biaxially drawn, blow-molded PET bottle with a handle, which bottle is highly safe and easy to handle, even in the case of large-size bottles with a capacity as large as a few liters.

DISCLOSURE OF THE INVENTION

The means of carrying out the first embodiment to solve the above-described technical problems exists in the configuration in which a synthetic resin bottle with a handle comprises a biaxially drawn and blow-molded bottle made of the PET resin, and a handle, an injection-molded product made of a synthetic resin, which is fitted firmly to the bottle as the insert, with said bottle having a recession that has been caved in at the rear of the body and also comprising a vertical projecting wall disposed in the central part of the bottom of this recession, and said handle comprising a pair of fitting beams disposed in parallel to each other in the standing position and a grip plate integrally disposed to connect between the pair of fitting beams at both the upper and lower ends thereof, wherein embedded ridges are disposed broadly in the direction of central axis of the preform at the positions where said embedded ridges stem from the pair of the fitting beams and extend from the base toward the front end face while expanding in width, so that the front end faces are opposed to the periphery of the preform under the condition that the handle is set inside the blow-molding tool, and wherein a part of the fitting beams and the embedded ridges constitute the handle inserts that are fitted to the recession bottom on both sides of the vertical projecting wall of the bottle.

Under the above-described configuration of the first embodiment, embedded ridges are disposed broadly in the direction of central axis of the preform at the positions where the embedded ridges stem from the pair of the fitting beams so that the front end faces are opposed to the periphery of the preform under the condition that the handle is set inside the blow-molding tool. Even when bottles with a capacity as large as a few liters are molded, it is possible to make the front end face of the embedded ridge come close to the preform. The preform expanded by air blow at first comes in contact with each front end face, covers it, then turns both corners, reaches the base of the embedded ridge where the ridge is integrated with the fitting beam, and thus gets around the embedded ridge tightly over its outer surface in the initial stage of drawing, i.e., in the state with no stress hardening.

Especially if large-size bottles are molded, the blow pressure has to be increased to a considerably high level, and the embedded ridges receive large force. By disposing the embedded ridges broadly in the direction of central axis of the preform, it is possible for this force to be directed from the front end face to the base in a depressing manner. Since little force is directed laterally, the embedded ridges can be prevented from getting broken.

The embedded ridges have a simple shape in which the ridges extend from the base to the front end face while expanding in width. Such a shape allows the PET bottle wall to move along without being hooked or being ruptured, and smooth PET drawing and deforming can be obtained. Furthermore, because the PET bottle wall can get around the embedded ridges as described above, there can be obtained strong fitting without jouncing movement.

The means of carrying out the second embodiment exists in the configuration that embedded ridges are located near a corner set by outer end face and opposed side of each fitting beam, with the cross-section of the embedded ridges having the shape of a roughly right-angled triangle formed by one side of the right angle extending roughly perpendicular direction from said opposed side and the other side of the right angle extending roughly perpendicular direction from said outer end face.

Each embedded ridge in the configuration of the second embodiment comprises an engaging ridge used to fit the conventional handle firmly against the force acting forward or backward and an embedded projecting piece used to fit the handle firmly against the force acting in the lateral direction. Both components are combined into one so that the cross-section of the embedded ridge has the shape of a roughly right-angled triangle, which the PET wall portion finds it easy to get around. At the time of blow molding, the hypotenuse of this right-triangular embedded ridge is allowed to stick out in such a way that the embedded ridges are disposed near the outer periphery of the preform to face the wall portion.

The preform is expanded by air blow. The expanded preform at first comes in contact with each hypotenuse namely front end face of the embedded ridge, covers it, and then turns both corners. At one corner, the preform deforms along the side of the ridge, which is extending roughly perpendicular direction from the opposed side of the fitting beam, and reaches this opposed side. At the other corner, the preform deforms along the other side of the embedded ridge extending roughly perpendicular direction from the outer end face of the fitting beam, and reaches the outer end face of the fitting beam. Thus, the insertion of the handle into the recession of the bottle is completed. Since the embedded ridge has a generally triangular shape in its cross-section, the preform is allowed to get around the embedded ridge tightly along its outer surfaces.

Because of the above-described shape given to the embedded ridges, the PET wall of the bottle in its blowing process never gets stuck with the embedded ridges and bursts up.

Although the embedded ridges have the shape of roughly right-angled triangle in their cross-section, this shape widens from the base toward the edge, and ensures that the PET wall gets around the embedded ridges. Along with this effect, the strength of handle fitting with the bottle can also be increased.

The means of carrying out the third embodiment exists in the configuration that the embedded ridges specified in the second embodiment have a gentle arc along the hypotenuse of the roughly right-angled triangle in the cross-section.

Under the above-described configuration of the third embodiment, the outer surface of the preform at first comes in contact with the stick-out front end face of each embedded ridge in the initial stage of air blow process. Thus, it becomes easy for the PET bottle wall to move along the front end face and to get around the both side of the embedded ridge smoothly and securely.

The means of carrying out the fourth embodiment exists in the configuration that the embedded ridge specified in the first three embodiments has two peaks in the forward, peak height direction.

Under the configuration of the fourth embodiment, the PET bottle wall gets around the embedded ridge across the low area between the two peaks. This ensures firm fitting also in the vertical direction.

The means of carrying out the fifth embodiment exists in the configuration that the embedded ridges specified in the previous embodiments have smooth rounded surfaces.

Under the above-described configuration of the fifth embodiment, the smooth rounded surfaces of the embedded ridges make it possible for the PET preform to be drawn and deformed smoothly without getting hooked by the corners of the embedded ridges and to be blow-molded successfully into the bottle.

The means of carrying out the sixth embodiment exists in the configuration that the handle specified in the previous embodiments is made of PET.

The above configuration of the sixth embodiment facilitates separate collection of bottles at the time of waste disposal.

The means of carrying out the seventh embodiment exists in the configuration that the embedded ridges specified in the sixth embodiment are provided with many lateral, narrow grooves on the peripheral surfaces.

As compared with the polypropylene handle, the PET handle has lower slidability upon contact with the PET bottle wall. Due to the above-described configuration of the seventh embodiment, slidability is improved between the PET bottle wall and the handle inserts. As a result, the bottle can be blow-molded more smoothly, and the PET bottle wall is allowed to get around the embedded ridges without fail.

The means of carrying out the eighth embodiment exists in the configuration that almost entire surfaces of the inserts of the handle specified in the sixth or seventh embodiments have been roughened in advance for the convenience of smooth contact with the bottle during the blow molding operation.

Under the above-described configuration of the eighth embodiment, slidability is improved between the PET bottle wall and the handle inserts. As a result, the bottle can be blow-molded more smoothly, and the PET bottle wall is allowed to get around the embedded ridges sufficiently.

The means of carrying out the ninth embodiment exists in the configuration that the handle specified in the sixth, seventh and eighth embodiments comprises a pair of fitting beams disposed in parallel to each other in the standing position, connecting arms that are bent and connected to the upper and lower ends of the fitting beams, a grip plate integrally disposed to connect between the pair of fitting beams through the intermediary of the connecting arms, wherein the connecting arms, a part of the fitting beams, and embedded ridges constitute the handle inserts that are fitted to the recession bottom on both sides of the vertical projecting wall of the bottle under the condition that the connecting arms have portions covered with smooth surfaces that come in contact with the bottle.

The grip plate is integrally disposed to connect between the pair of fitting beams through the intermediary of the bent connecting arms at both the upper and lower ends. In this configuration, the handle can be inserted smoothly into the recession bottom on both sides of the vertical projecting wall of the bottle, and there can be obtained a bottle with a handle having fine appearances.

Therefore, when the PET preform is drawn, strong force pushes a portion of the expanding bottle wall against the surfaces of the inserts of the PET handle, i.e., the surfaces of the connecting arms, the fitting beams, and the embedded ridges. At that time, the PET bottle gets abrasions on the clear bottle wall, especially at places near the connecting arms. The problem of resultant bad appearance of the bottle has to be solved.

The connecting arms are disposed behind the main portions of the handle inserts, including the front end faces of the embedded ridges or the outer end faces of the fitting beams, and are bent backward and connected to the grip plate. Because of such a shape, the closer to the connecting portions of the grip plate, the more distant positions, away from the outer wall surface of the preform, is taken by the outer end faces of the connecting arms under the condition that the handle has been set inside a split mold. The preform comes in contact with outer surfaces of the connecting arms in a much later time at a relatively advanced stage of drawing (expanding) deformation, i.e., under the condition that hardening due to drawing or what is called the "strain hardening" has already been in progress.

At the initial stage of drawing, the preform comes in contact with the front end faces of the embedded ridges, turns the corners thereof, and thus has relatively small opportunities in which the PET surface suffers abrasions. However, after the connecting arms have come in contact with the preform, the PET wall portion does not get around these arms, but is pressed against the front end faces of these arms by the large force caused by air blow. Since at that time, the PET wall portion is drawn and expands while sliding along the front end faces in a rasping way, abrasions are expected to occur.

The configuration according to the ninth embodiment has been devised, while giving consideration to the state in which the PET preform is drawn and hardened at the stage of contact with the connecting arms, and also to the mechanism of abrasions. These abrasions can be prevented from occurring, by smoothing beforehand the surfaces of the connecting arms that come in contact with the expanding preform. Thus, the slidability of the expanding preform is improved when it slides over the smooth surfaces of the connecting arms.

The PET preform, when used in the softened state as is the case in this invention, undergoes a large change in viscoelasticity, depending on the temperature and the drawing record. Yet it is presumed that the improved slidability caused by the smoothed contact areas is effective after the PET drawing has been in much progress and the PET is right in the process of large strain hardening.

The means of carrying out the tenth embodiment exists in the configuration that the connecting arms specified in the ninth embodiment have smooth surfaces only in the specific areas.

Under the above-described configuration of the tenth embodiment, smooth surfaces of the connecting arms are achieved by smoothing (mirror-finishing) those corresponding portions of the injection molding mold. The development of abrasions is delicately affected by such factors as the angle of contact between the expanding preform and the surfaces of the connecting arms, which are disposed at a total of 4 places, i.e., upper and lower ends of the right and left sides of the grip plate. In a case, abrasions occur only on the upper connecting arms. Therefore, it is not always necessary to smooth all the surfaces of the four connecting arms, which come in contact with the bottle. The occurrence of abrasions can be controlled by smoothing partially those specific portions that are selected suitably while checking over the places of abrasions.

A PREFERRED EMBODIMENT OF THE INVENTION

Figure 1:
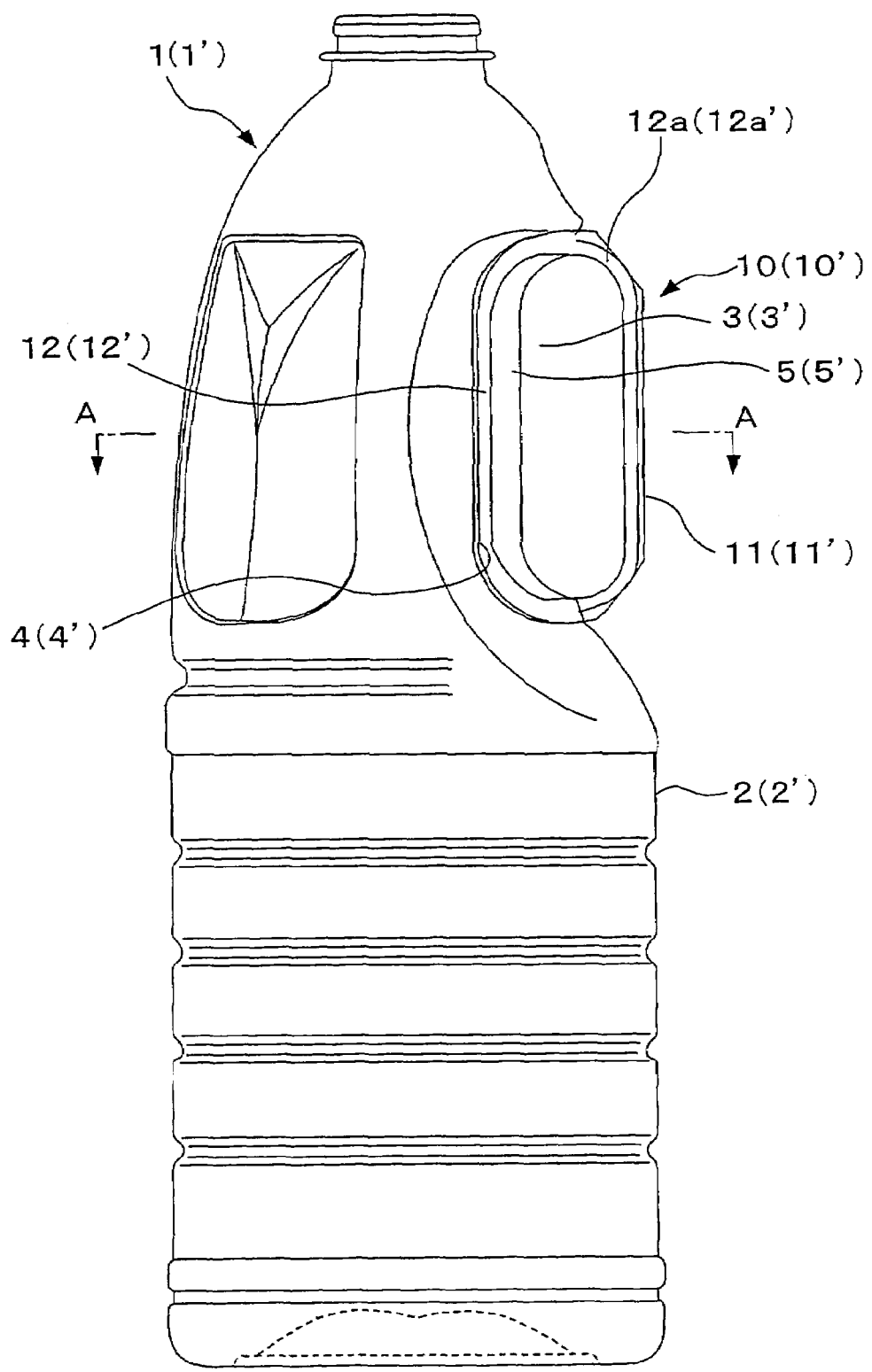
FIG. 1 is a side view of the entire synthetic resin bottle with a handle in an embodiment of this invention.

This invention is further described with respect to a preferred embodiment, now referring to the drawings (FIGS. 1-8).

The bottle of this invention comprises the bottle 1 and the handle 10. The bottle 1 is a biaxially drawn, blow-molded PET product of a large size (1.0 liter or more), and is provided with a recession 3 that has been caved in at the rear of the upper half of the bottomed cylindrical body 2. The handle 10 is an injection-molded PET product, which is fitted firmly to the recession 3 by an insert molding means.

The recession 3 of the bottle 1 comprises a vertical projecting wall 5 disposed in the center of recession bottom 4, where the flat projecting wall 5 stands upright, except for the upper and lower ends of the recession 3. This projecting wall 5 is relatively wide and extends vertically over the total height of the recession 3, with the wall height being roughly constant from side to side (See FIG. 2).

A pair of fitting beams 12 in a straight bar shape is disposed in parallel to each other and is connected to the vertical grip plate 11 through the intermediary of the connecting arms 12a that are curved at both the upper and lower ends. The embedded ridges 17 are located near the corner set by the outer end face 13 and the opposed side 14a of each fitting beam 12. The cross-section of each embedded ridge has a generally right-angled triangular shape formed by one side of the right angle extending roughly perpendicular direction from the opposed side 14a and the other side of the right angle extending roughly perpendicular direction from the outer end face 13 (See FIG. 6(a)).

Figure 2:
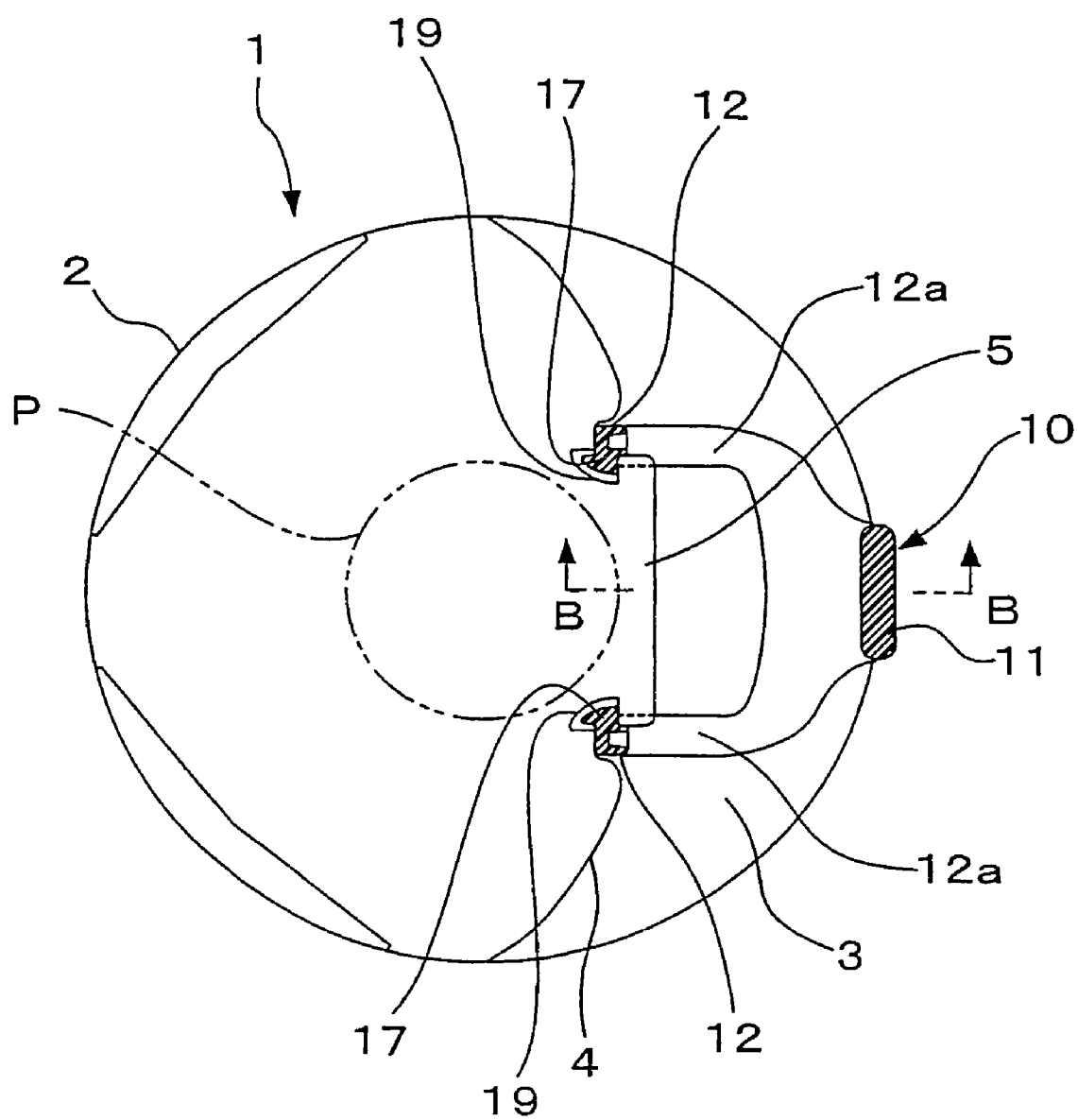
FIG. 2 is a cross-sectional plan view of the bottle with a handle, taken from line A-A in FIG. 1.
Figure 3:
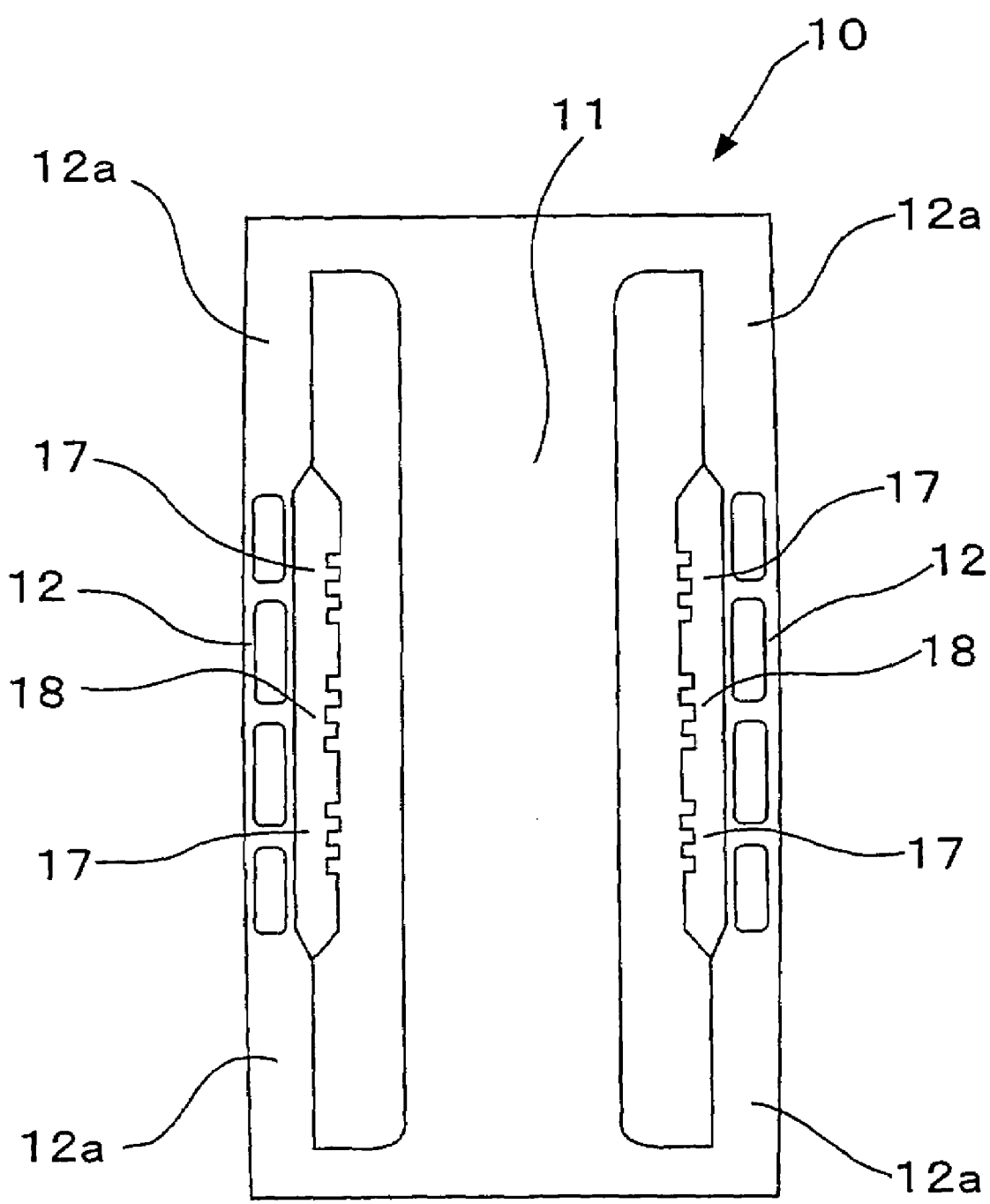
FIG. 3 is a rear view of the handle used in the embodiment shown in FIG. 1.

Under the above-described configuration, the embedded ridges 17 are disposed broadly in the direction of central axis of the preform at the positions where the embedded ridges 17 stem from the pair of the fitting beams 12 and extend from the base toward the front end face 19 while expanding in width, so that the front end faces 19 are opposed to the periphery of the preform under the condition that the handle is set inside the blow-molding tool (See FIG. 2).

The front end face 19 of the embedded ridge 17 corresponds to the hypotenuse of a right-angled triangle in its cross-section, and forms a gentle arc. Almost entire surfaces of the handle inserts are roughened in advance. And many lateral, narrow grooves 25 are notched in the outer peripheral surface of each embedded ridge 17. All these devices improve the slidability of the PET wall of the bottle 1 when it is in the softened state during the blow molding.

The embedded ridge 17 in this embodiment is a two-peak ridge with a low area 18 in between. In this low area 18, the engaging ridge 16 is disposed as an insert, which has a shape obtained by cutting out a portion perpendicular to the outer end face 13 of the fitting beam 12 from the cross-section of the embedded ridge 17 (See FIG. 6(*b*)). The two-peak form of the embedded ridge 17 is intended to reduce the handle weight and to improve the fitting strength further by allowing the wall of the PET bottle to get around this low area 18. In designing an embedded ridge 17, one skilled in the art can decide on whether the two-peak form is adequate or not, giving consideration to the moldability, because a ridge without the low area 18 has also full fitting strength. In addition, the embedded ridge 17 may have three or more peaks, depending on the purpose.

The surfaces of the curved connecting arms 12*a*, or at least those surfaces thereof that come in contact with the bottle 1, have been smoothed in advance. This improves the slidability of the drawn and expanding PET preform P during the biaxial drawing and blow molding operation using the handle 10 as the insert, and also prevents the bottle 1 from getting damages caused by friction.

Figure 7:
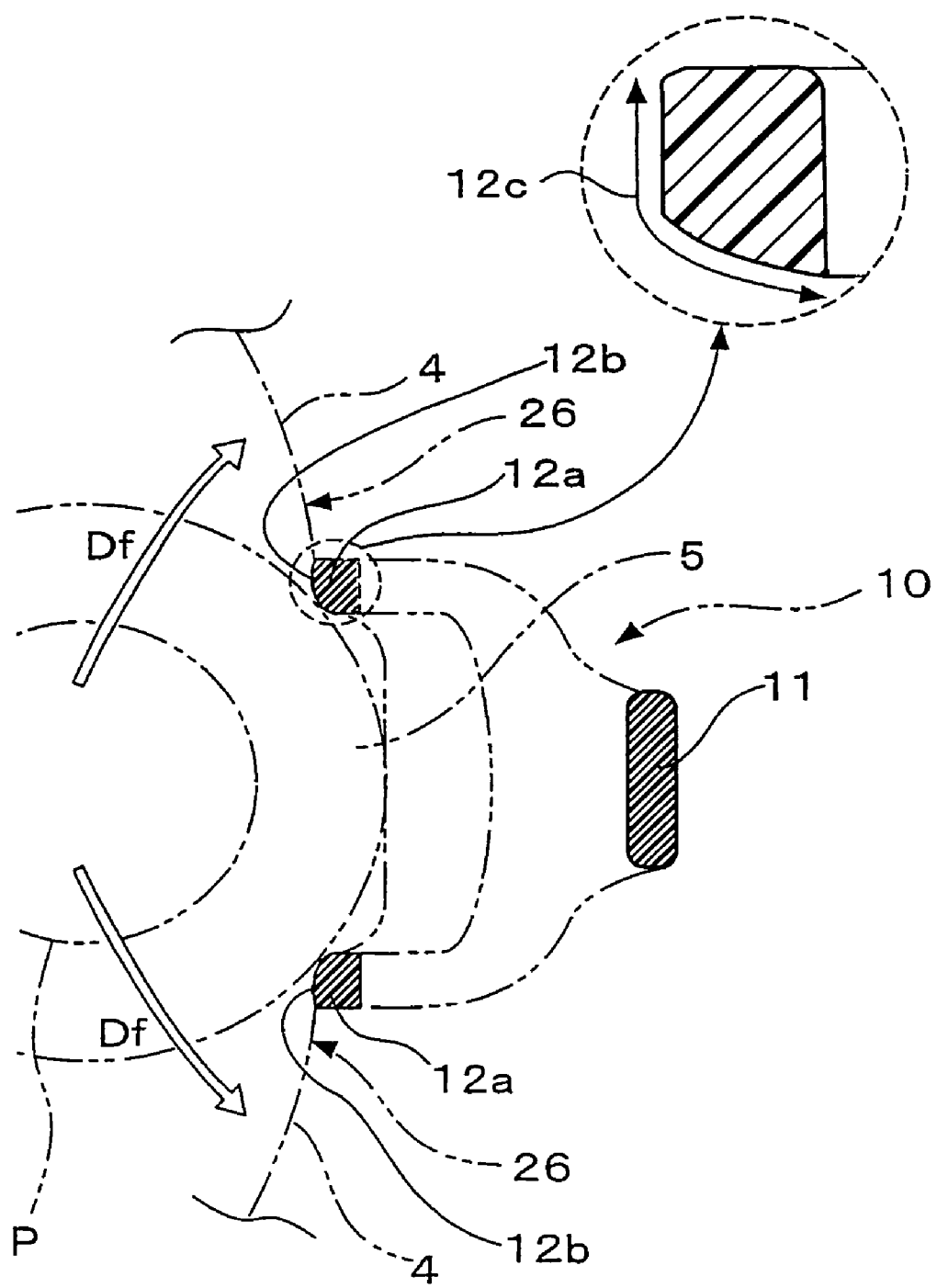
FIG. 7 is an explanatory diagram shown in a cross-sectional plan view, taken from line F-F in FIG. 4.

In the preferred embodiment of this invention, the pair of upper connecting arms 12*a* has been smoothed over the range indicated by 12C in FIG. 7. Depending on the abrasion development situation, the area to be smoothed can be selected. For example, the pair of lower connecting arms 12*a* can be smoothed, if necessary.

The handle 10 is fitted to the bottle 1 by using the handle 10 as the insert and by drawing biaxially and blow-molding the bottle 1. At the time of blow molding, the embedded ridge 17 is disposed at a position opposite the neighborhood of outer wall of the bottle in such a manner that the front end face 19 of the embedded ridge 17 is stuck out under the condition that the handle has been set inside the blow-molding tool (See FIG. 2).

The PET preform P is expanded into the bottle 1 by air blow. The expanded PET wall of the preform P comes in contact with the front end face 19 of the embedded ridges 17, covers it, and then turns both corners 21*a* and 21*b*. At one corner 21*a*, the preform deforms along the rear side of the embedded ridge 20*a* and reaches the opposed side 14*a*. At the other corner 21*b*, the preform deforms along the side of the embedded ridge 20*b* and the outer end face 13 of the fitting beam 12. Finally the preform reaches the edge of the outer side 14*b* of the fitting beam 12, and thus, the insertion of the handle 10 into the recession of the bottle 1 is completed. Since the embedded ridge 17 has a generally right-angled triangular shape in its cross-section, the PET preform is allowed to get around the embedded ridge 17 tightly along its outer surfaces (See FIG. 6(*a*)).

The above-described blow molding with the handle 10 used as the insert ensures that the embedded ridges 17 and a part of fitting beams 12 are inserted and embedded in the recession bottom 4 on both sides of the vertical projecting wall 5 of the bottle 1. Thus, the handle 10 is firmly fitted to the bottle 1 (See FIG. 2).

Bottles with a capacity of 4 liters were blow-molded, and the handle strength was measured by a handle-pulling method, to determine the strength of the inserts of handle 10. The bottle in the embodiment of this invention gave a value of 61 Kgf, which was twice or more in its strength, as compared to 25 Kgf in the conventional example shown in FIG. 1 (common to both of the conventional example and this invention) and FIGS. 9-12.

Figure 4:
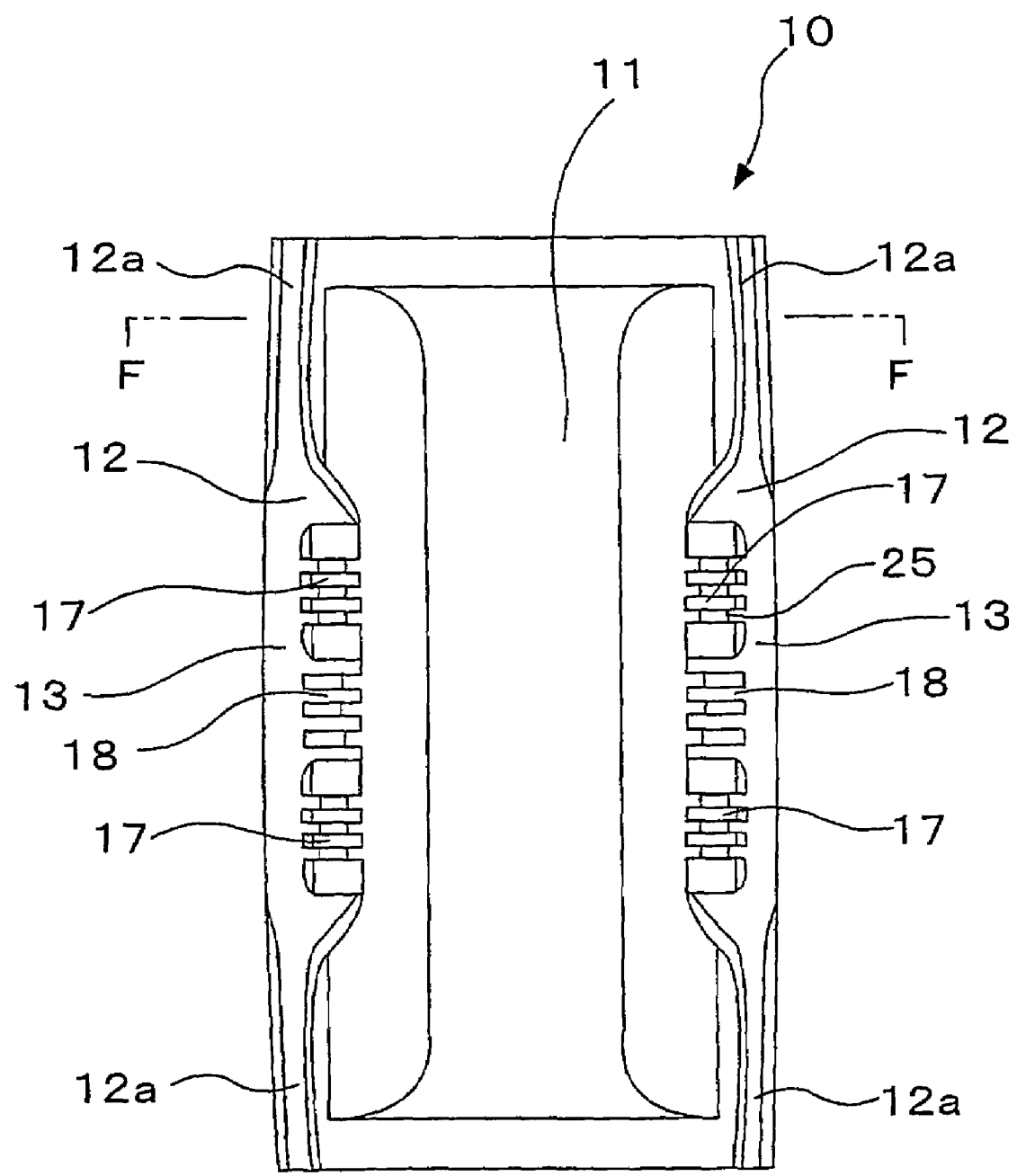
FIG. 4 is a front elevational view of the handle used in the embodiment shown in FIG. 1.
Figure 5:
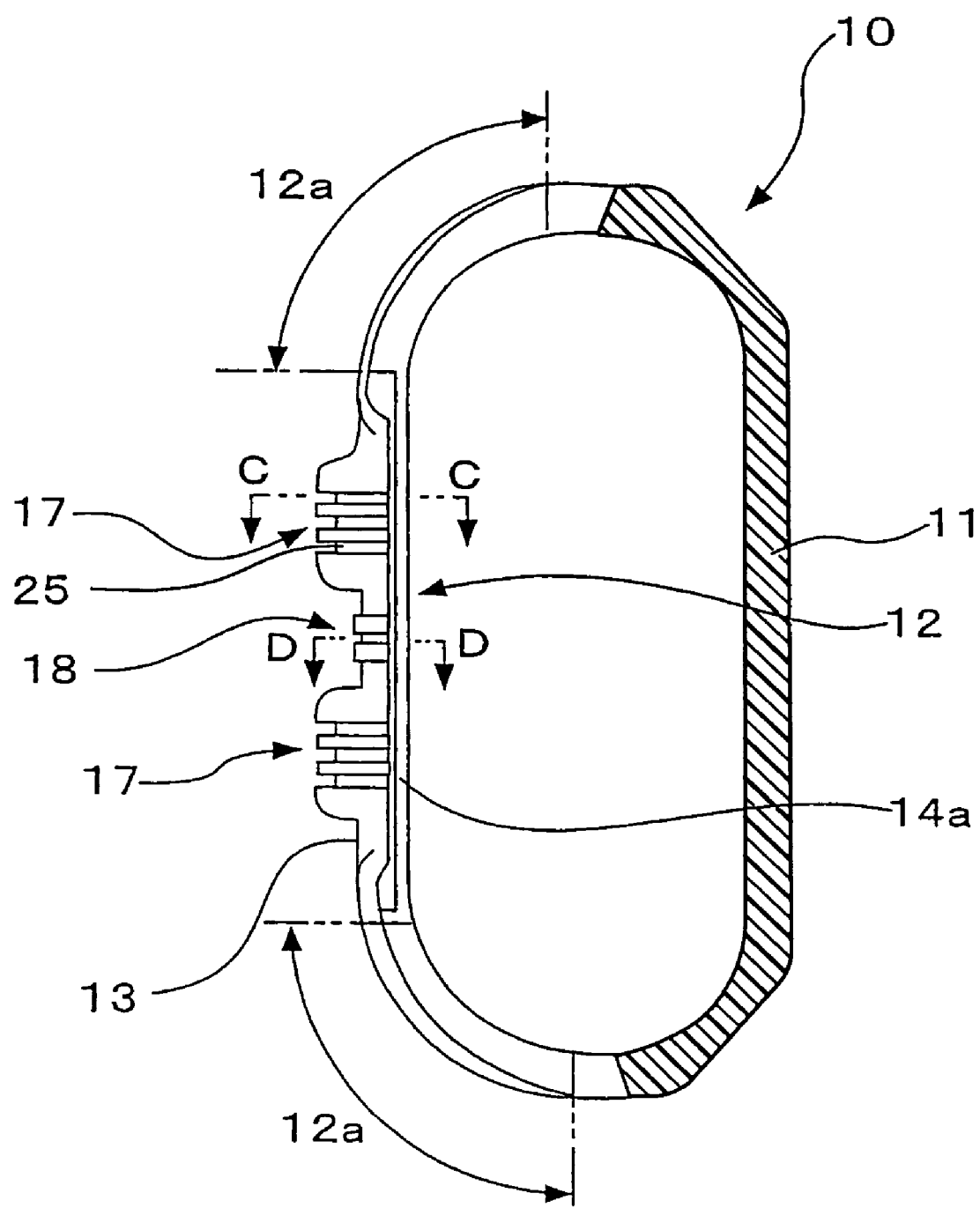
FIG. 5 is a cross-sectional view of the handle used in the embodiment shown in FIG. 1, taken from line B-B in FIG. 2.
Figure 6:
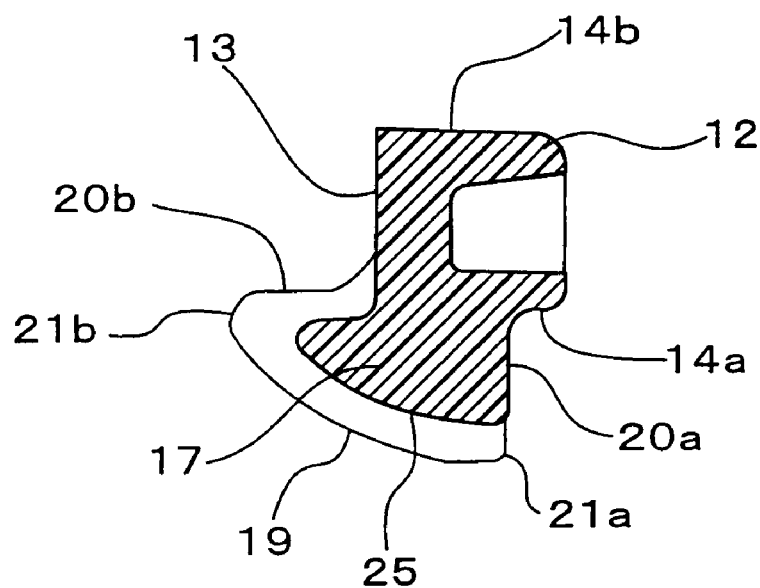
FIGS. 6(a) and 6(b) are cross-sectional plan views of important parts, taken from lines C-C and D-D in FIG. 5.
Figure 6:
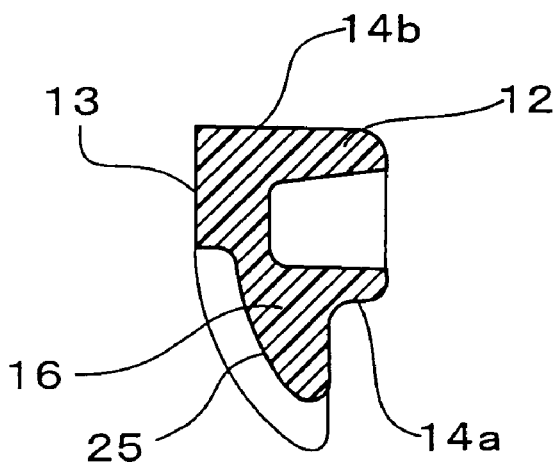

In the meantime, FIG. 7 is an explanatory diagram showing estimated deformation of the preform P at a height of the well upper portion of each connecting arms 12*a* near the connection to the grip plate 11 (the height of line F-F in FIG. 4). The preform P presumably comes in contact with the end face 12*b* of the connecting arms 12 in the state in which the preform P has been drawn and expanded considerably more than when the preform P has come in contact with the front end faces 19 of the embedded ridges 17 or with the outer end faces 13 of the fitting beams 12. Then, the preform P is further drawn and deformed, while sliding along the end face 12*b* of the connecting arms 12*a* without getting around the connecting arms 12*a* so largely as to reach the rear side. The arrows Df in FIG. 7 indicate the estimated directions in which the preform P is expanded and deformed.

Bottles with a 4-liter capacity in the shape shown in the embodiment were blow-molded to determine the smoothing effect of especially the connecting arms used in the bottle of this invention. For the non-smoothed surfaces of the connecting arms 12*a*, abrasions were found at a high frequency, especially at positions near the upper connecting arms (Abrasive wall portion 26 in FIG. 7). These abrasions could have been prevented from occurring by smoothing beforehand those areas where expanding preform P comes in contact with the upper connecting arms 12*a* (Smoothed area 12*c* in FIG. 7).

Figure 8:
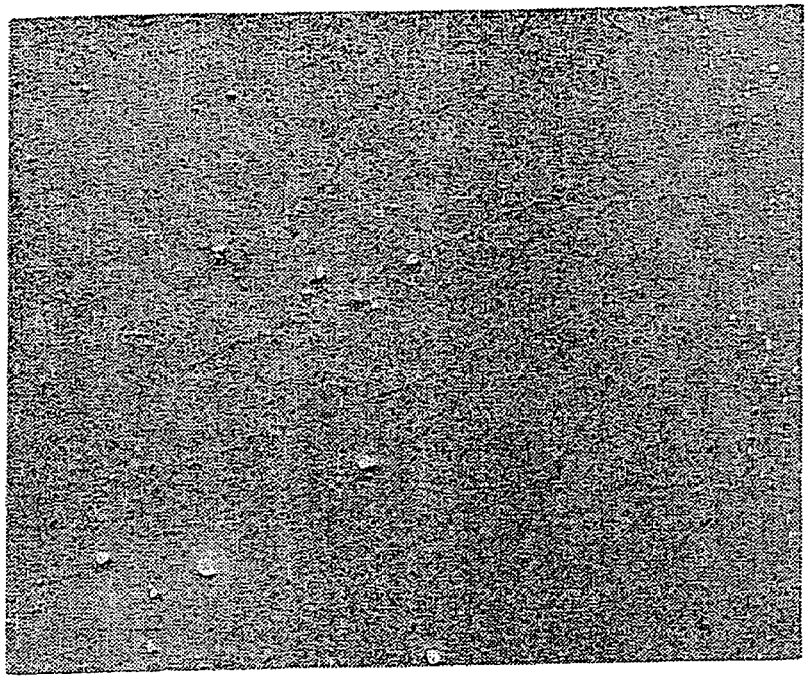
FIGS. 8(a) and 8(b) are referential photographs showing magnified surfaces of the connecting arms of the handle before (b) and after (a) the smoothing treatment.
Figure 8:
Figure 9:
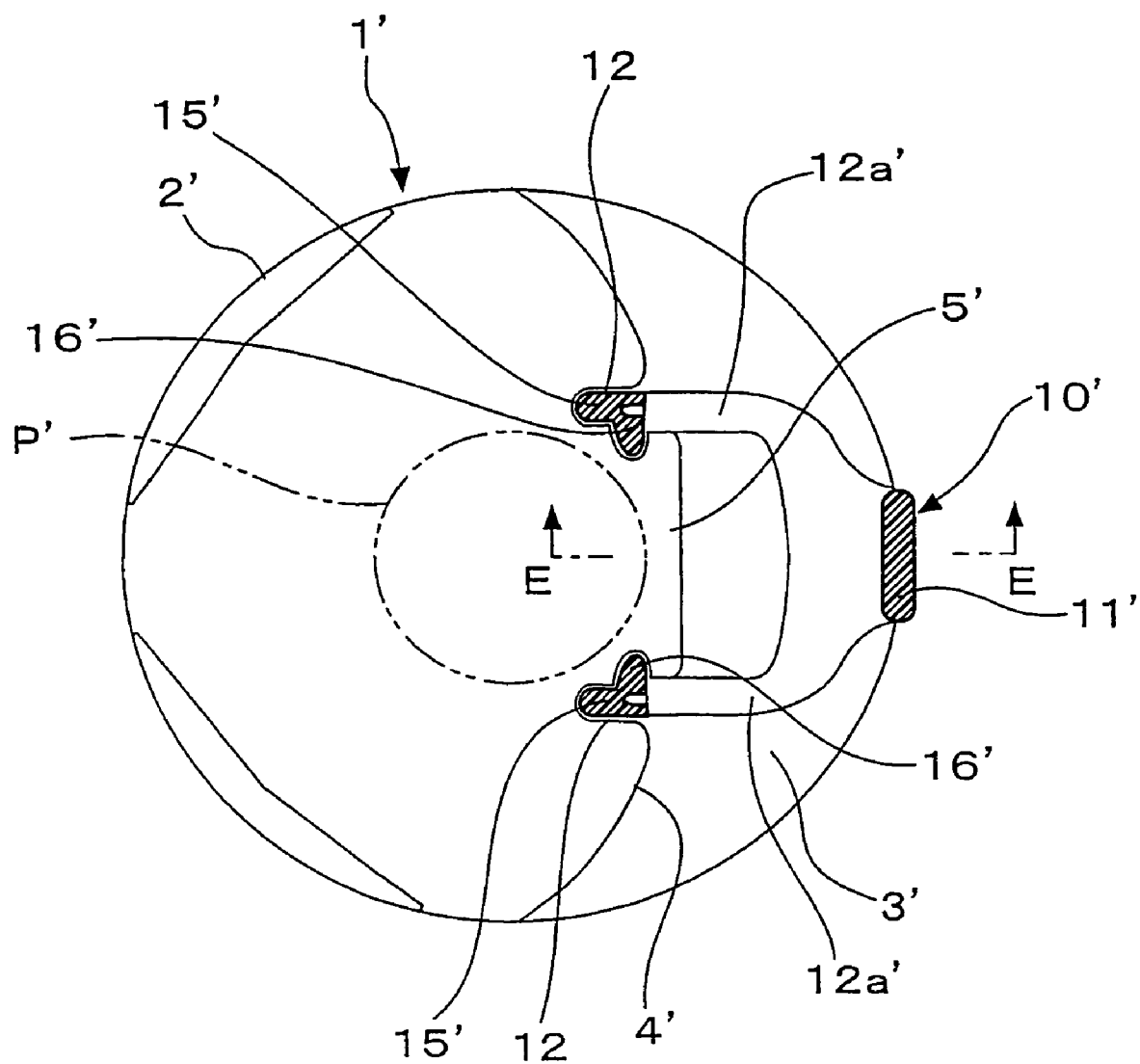
FIG. 9 is a cross-sectional plan view of the synthetic resin bottle with a handle in the conventional art, taken from A-A in FIG. 1.
Figure 10:
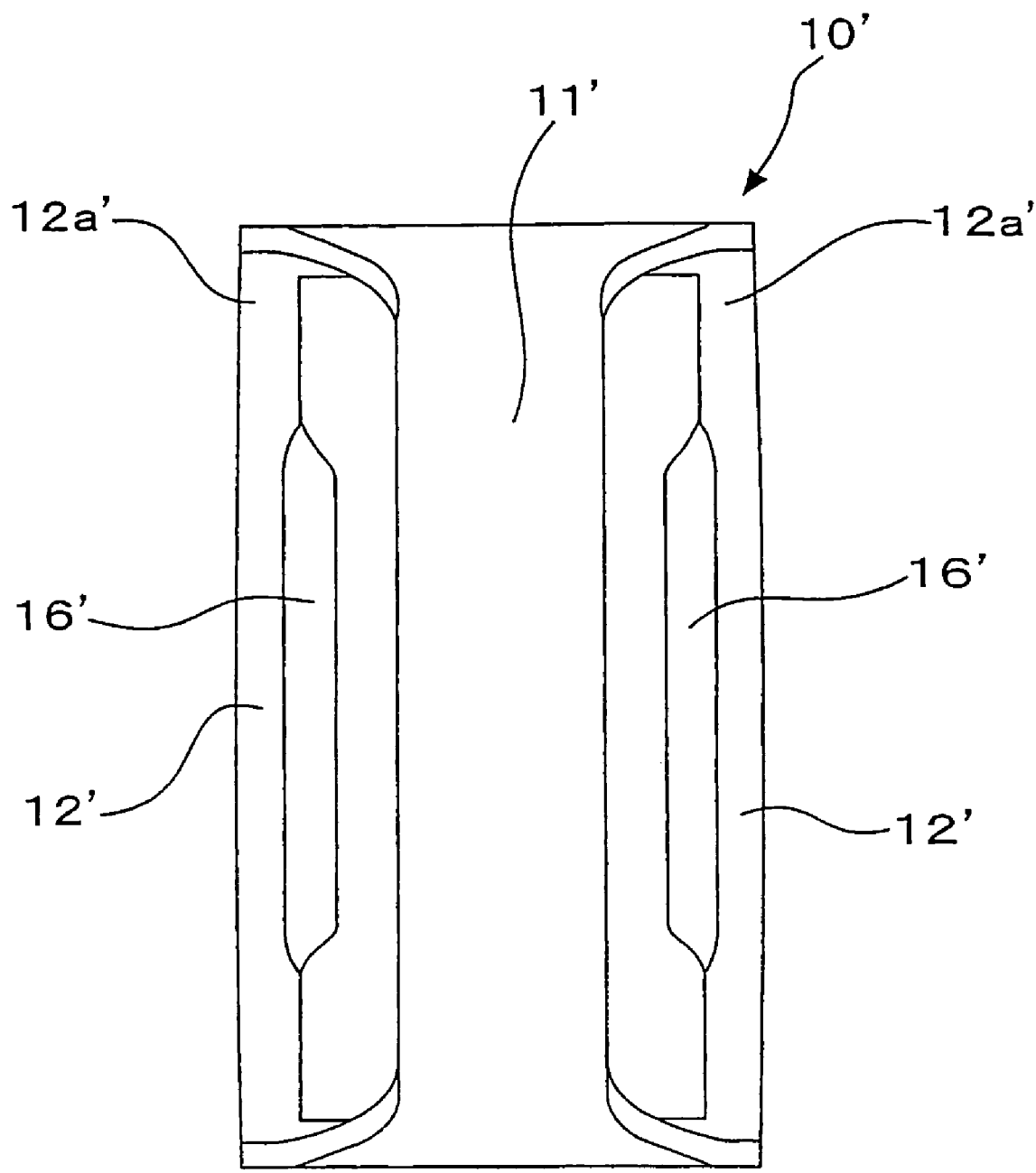
FIG. 10 is a rear view of the handle used in the conventional art shown in FIG. 9.
Figure 11:
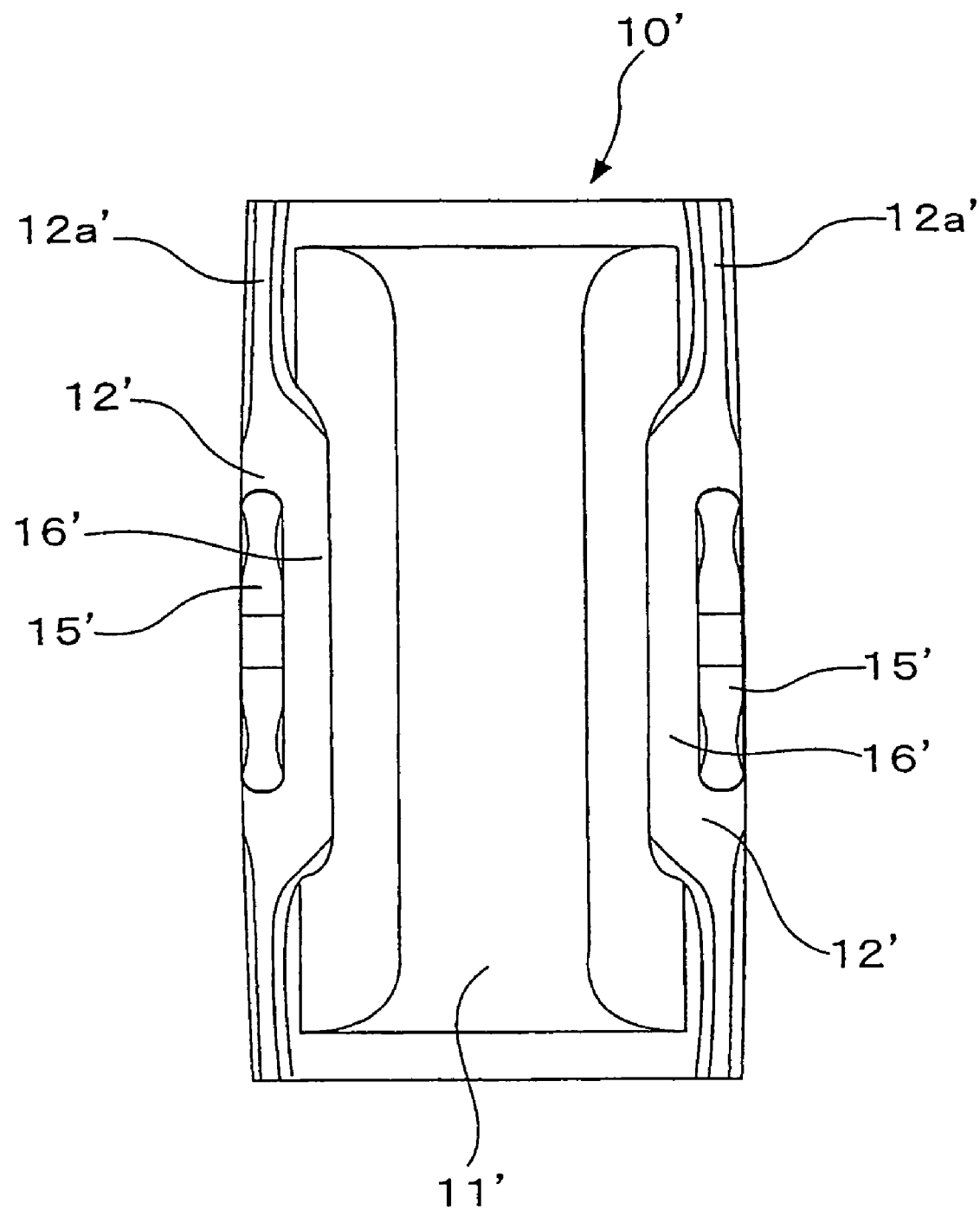
FIG. 11 is a front elevational view of the handle used in the conventional art shown in FIG. 9
Figure 12:
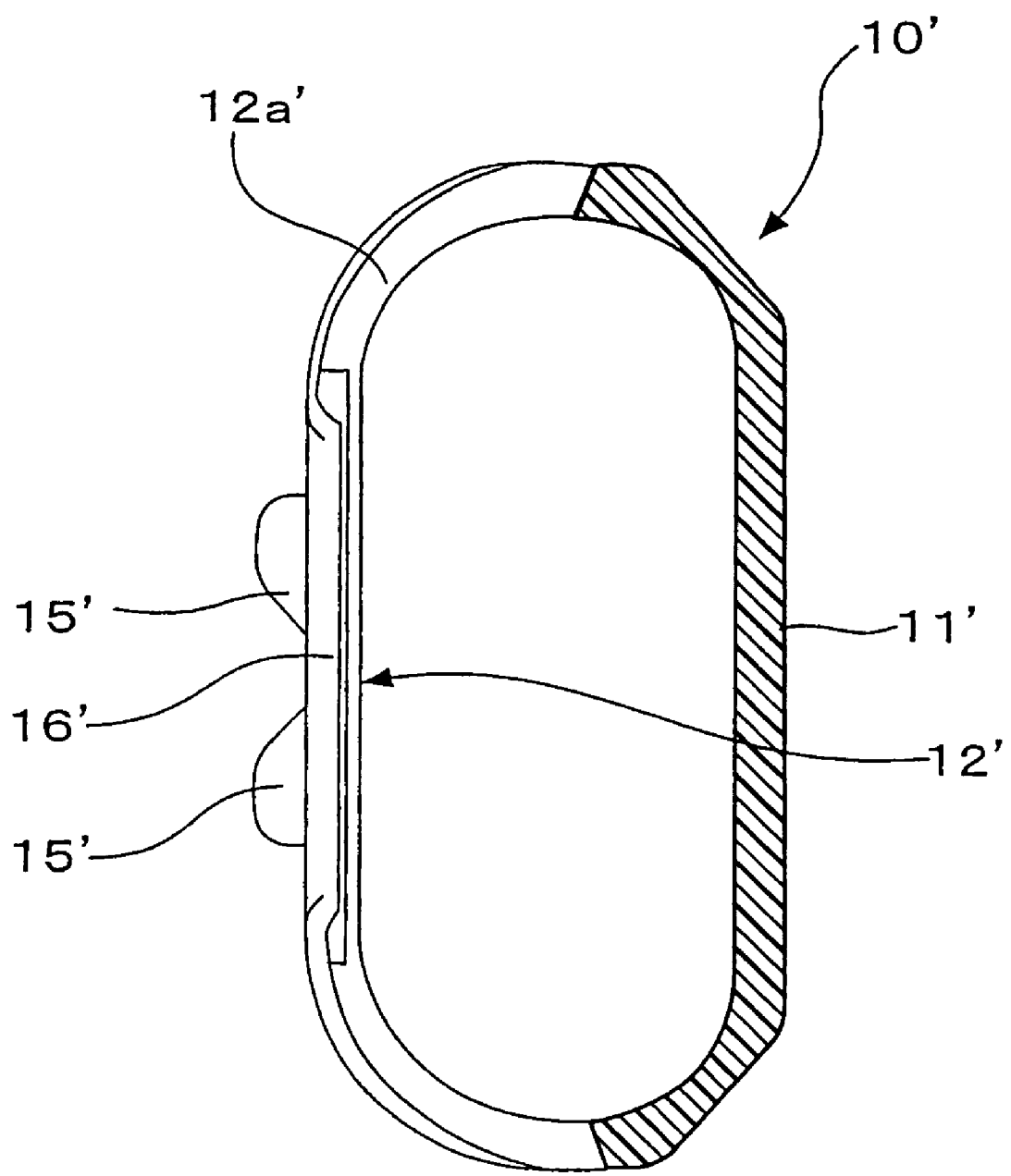
FIG. 12 is a cross-sectional view of the handle shown in FIG. 9, taken from line E-E in FIG. 9.

FIGS. 8(*a*) and 8(*b*) are referential photographs showing surface states of the connecting arms 12*a* before and after the above-described smoothing treatment.

INDUSTRIAL APPLICABILITY

This invention comprising the above-described configuration has the following effects:

In the configuration of the first embodiment, even when bottles as large as a few liters are molded, it is possible to make the front end face of the embedded ridge come close to the preform. The preform expanded by air blow at first comes in contact with each front end face, covers it, then turns both corners, reaches the base of the embedded ridge that is integrated with each fitting beam, and thus gets around the embedded ridge tightly along its outer surface at the initial stage of drawing, i.e., in the state with no stress hardening.

The embedded ridges have a simple shape in which each ridge extends from the base to the front end face while expanding in width. Such a shape allows the PET bottle wall to move along without being hooked or being ruptured, and smooth PET drawing and deforming can be obtained. Furthermore, because the PET bottle wall can get around the embedded ridges as described above, there can be obtained strong fitting of the handle to the bottle.

In the second embodiment, the embedded ridges are given the shape of a roughly right-angled triangle in their cross-section. This enables the PET bottle wall to get around the embedded ridges easily in the blow molding operation and allows the handle and the bottle to be fitted firmly to each other.

Although the embedded ridges have the shape of a roughly right-angled triangle in their cross-section, this shape widens from the base toward the edge, and ensures that the PET wall gets around the embedded ridges stably. Along with this effect, the strength of handle fitting to the bottle can also be increased.

In the third embodiment, the embedded ridges have a gentle arc along their front end faces. The outer surface of the preform at first comes in contact with the stick-out front end face of each embedded ridge at the initial stage of air blow process. Thus, it becomes easy for the PET bottle wall to move along the front end face and to get around the embedded ridge to reach the both side thereof smoothly and securely.

In the fourth embodiment, two-peak embedded ridges are formed in the forward, peak height direction. The PET bottle wall gets around the embedded ridge across the low area between two peaks. This ensures firm fitting also in the vertical direction.

In the fifth embodiment, the smooth rounded surfaces of the embedded ridges make it possible for the PET bottle wall to be drawn and deformed smoothly without getting hooked by the corners of the embedded ridges and to be blow-molded successfully into the bottle.

In the sixth embodiment, the handle is made of PET so as to facilitate separate collection of bottles at the time of waste disposal.

In the seventh embodiment, many lateral, narrow grooves are notched in the outer surfaces of the embedded ridges. Due to this configuration, slidability can be secured even between the PET handle inserts and the PET bottle wall. The bottle can be blow-molded more smoothly than ever, and the PET bottle wall is allowed to get around the embedded ridges successfully.

In the eighth embodiment, almost entire surfaces of the handle inserts have been roughened in advance. This also serves to secure the slidability between the PET bottle wall and the PET handle inserts. As a result, the bottle can be blow-molded more smoothly than ever, and the PET bottle wall is allowed to get around the embedded ridges sufficiently.

In the ninth embodiment, abrasions can be prevented from occurring, by smoothing the surfaces of the connecting arms that come in contact with the bottle so that the slidability is improved between the connecting-arm surfaces and the softened PET preform P, which is right in the process of drawing and expansion.

In the tenth embodiment, it is not always necessary to smooth all the surfaces of the connecting arms, which come in contact with the bottle. The occurrence of abrasions can be controlled by smoothing partially those specific portions that are selected suitably while checking over the places of abrasions.

The invention claimed is:

1. A synthetic resin bottle with a handle, comprising:
a biaxially drawn and blow-molded bottle made of a polyethylene terephthalate resin, the bottle comprising a recession with a projecting wall disposed in a central part of said recession; and a handle that is an injection-molded product made of a synthetic resin and is insert-molded with the bottle, said handle comprising a pair of fitting beams disposed in parallel to each other and on opposite sides of said projecting wall, and a grip plate integrally disposed to connect said pair of fitting beams at both an upper and a lower end thereof, wherein:
said fitting beams comprising embedded ridges disposed along a length of each of said fitting beams,
said embedded ridges extend from the pair of fitting beams to engage said recession and said projecting wall,
said embedded ridges have a surface disposed towards a central axis of a preform of the bottle, and
said embedded ridges are approximately perpendicular to said central axis and said embedded ridges become smoothly wider as said embedded ridges extend away from said fitting beams.

2. The synthetic resin bottle with said handle according to claim 1, wherein said embedded ridges are located near a corner set by outer end face and opposed side of each fitting beam, with the cross-section of said embedded ridge having the shape of a roughly right-angled triangle formed by one side of the right angle extending roughly perpendicular from said opposed side and the other side of the right angle extending roughly perpendicular from said outer end face.

3. The synthetic resin bottle with said handle according to claim 2 wherein the roughly right-angled triangle has a hypotenuse in the form of a gentle arc.

4. The synthetic resin bottle with said handle according to claim 1 wherein said embedded ridges have a two-peak configuration.

5. The synthetic resin bottle with said handle according to claim 1, wherein the embedded ridges have smooth rounded surfaces.

6. The synthetic resin bottle with said handle, according to claim 1, wherein the handle is made of a polyethylene terephthalate resin.

7. The synthetic resin bottle with said handle according to claim 6, wherein a plurality of narrow grooves are notched in the outer surfaces of said embedded ridges.

8. The synthetic resin bottle with said handle according to claim 6, wherein surfaces of the handle have been roughened where the handle comes in contact with the bottle.

9. The synthetic resin bottle with said handle according to claim 6, wherein said handle further comprises:
connecting arms that are bent and form a connection between the upper and lower ends of said fitting beams and said grip plate,
wherein said connecting arms, said fitting beams, and said embedded ridges constitute a handle insert that is fitted to the recession on both sides of the vertical projecting wall and said connecting arms have a smooth surface that comes in contact with the bottle.

10. The synthetic resin bottle with said handle, according to claim 9, wherein said smooth surfaces of the connecting arms are limited to a portion thereof.

* * * * *